(12) United States Patent
Walser et al.

(10) Patent No.: US 7,439,676 B2
(45) Date of Patent: Oct. 21, 2008

(54) COLD CATHODE FLUORESCENT LAMP WITH MOLYBDENUM ELECTRODE

(75) Inventors: Herman Walser, Breitenwang (AT); Wolfram Knabl, Reutte (AT); Gerhard Leichtfried, Reutte (AT); Jörg Hinrich Fechner, Mainz (DE); Franz Ott, Mitterteich (DE); Ralf Diezel, Mitterteich (DE); Brigitte Hueber, Schwandorf (DE)

(73) Assignees: Plansee SE, Reutte/Tirol (AT); Schott AG, Mainz (DE)

( * ) Notice: Subject to any disclaimer, the term of this patent is extended or adjusted under 35 U.S.C. 154(b) by 98 days.

(21) Appl. No.: 10/857,488

(22) Filed: May 27, 2004

(65) Prior Publication Data

US 2004/0239253 A1 Dec. 2, 2004

(30) Foreign Application Priority Data

May 27, 2003 (AT) .............................. GM370/2003

(51) Int. Cl.
*H01J 61/36* (2006.01)
*H01J 61/30* (2006.01)

(52) U.S. Cl. ........................ 313/618; 313/623; 313/633; 313/636; 501/64; 501/66

(58) Field of Classification Search ................... 313/623
See application file for complete search history.

(56) References Cited

U.S. PATENT DOCUMENTS

| 4,045,156 | A | * | 8/1977 | Chu et al. .................... 431/361 |
| 4,870,034 | A | * | 9/1989 | Kiefer .......................... 501/66 |
| 5,424,609 | A | * | 6/1995 | Geven et al. ................. 313/623 |
| 5,747,399 | A | * | 5/1998 | Kosokabe et al. ............. 501/67 |
| 6,074,969 | A | | 6/2000 | Naumann et al. |
| 6,287,993 | B1 | | 9/2001 | Fu et al. |
| 6,391,809 | B1 | * | 5/2002 | Young ......................... 501/57 |
| 6,525,475 | B2 | * | 2/2003 | Scholz et al. ................ 313/625 |
| 6,853,139 | B2 | * | 2/2005 | Yamashita et al. ........... 313/623 |
| 2002/0185974 | A1 | * | 12/2002 | Nakano et al. .............. 313/623 |
| 2003/0102805 | A1 | * | 6/2003 | Hataoka et al. ............. 313/623 |

FOREIGN PATENT DOCUMENTS

| EP | 512632 A1 | * | 11/1992 |
| EP | 0 913 366 A1 | | 5/1999 |
| JP | 01-151148 | | 6/1989 |
| JP | 11238489 A | * | 8/1999 |

(Continued)

*Primary Examiner*—Sikha Roy
(74) *Attorney, Agent, or Firm*—Laurence A. Greenberg; Werner H. Stemer; Ralph E. Locher

(57) ABSTRACT

A cold cathode fluorescent lamp (1) has feedthrough pins (5) made from molybdenum or a molybdenum alloy that form a glass-metal seal (6) with a glass composed of 55-75 wt. % $SiO_2$, 13-25 wt. % $B_2O_3$, 0-10 wt. % $Al_2O_3$, 5-12 wt. % alkali oxides, 0-3 wt. % alkali earth oxides, 0-5 wt. % $ZrO_2$, 0-10 wt. % $TiO_2$ und 0-5 wt. % remaining oxides. The lamp has hollow cathodes (4) made from a material of the group molybdenum, molybdenum alloys, niobium, niobium alloys, and the lamp is manufactured in a compact form using conventional manufacturing parameters, and the resulting lamp has crack free, long-term vacuum-tight glass-metal seals.

10 Claims, 1 Drawing Sheet

FOREIGN PATENT DOCUMENTS

| | | |
|---|---|---|
| JP | 2000057999 A | 2/2000 |
| JP | 2000-133201 | 5/2000 |
| JP | 2000215849 A | 8/2000 |
| JP | 2002-358922 | 12/2002 |
| JP | 2003151496 A * | 5/2003 |

* cited by examiner

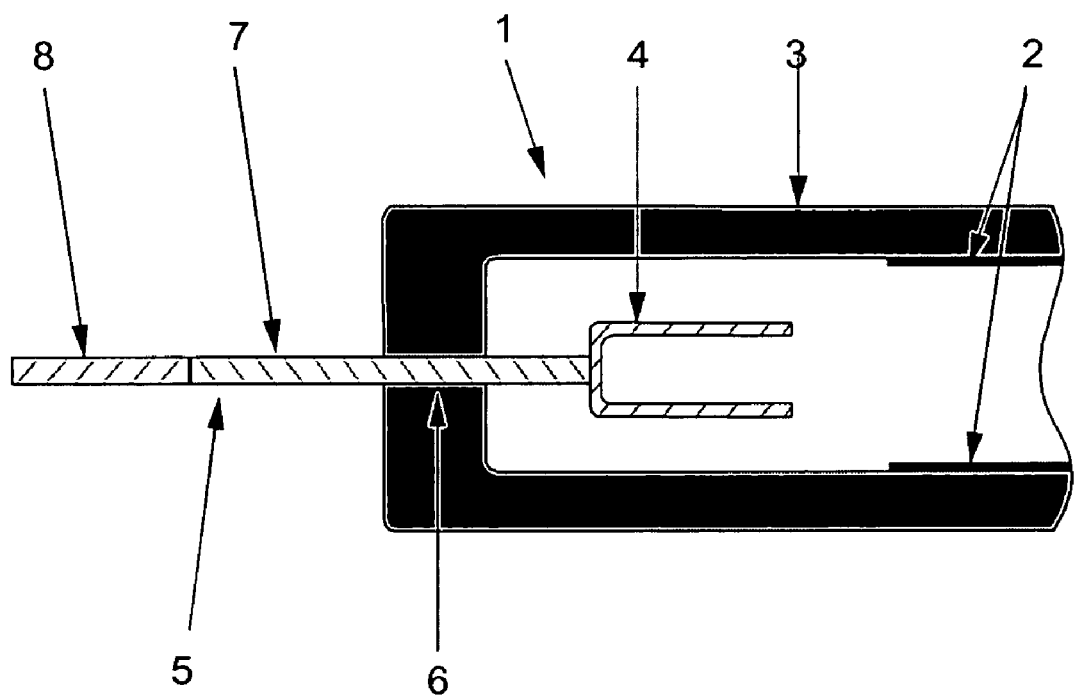

COLD CATHODE FLUORESCENT LAMP WITH MOLYBDENUM ELECTRODE

BACKGROUND OF THE INVENTION

Field of the Invention

The invention pertains to a cold cathode fluorescent lamp essentially consisting of a hard glass discharge envelope with a phosphor coating on its inner surface and a filling gas component capable of emitting UV light, two or more hollow cathodes, two or more electrical feedthroughs and two or more glass-metal pinch seals which provide a vacuum tight seal between the discharge envelope and the electrodes.

Cold cathode fluorescent lamps are used as backlights in LCD displays. A low pressure mercury discharge creates UV radiation, which is converted to visible light by the phosphor coating on the inner surface of the discharge envelope. The discharge envelope is generally made of hard glass, such as borosilicate glass, and it is usually in the shape of a tube. At each end of the tube is an electrode, the shape of which differs with the lamp type. The electron work function of the electrode surface can be reduced by applying substances, containing for instance Ba, Sr, rare earth metals, or yttrium, that enhance the emission of electrons, to the surface of the electrode. The electrodes are contacted by way of feedthrough pins. These are connected to the discharge envelope in a vacuum seal via a pinch or melt-in connection. This area is known as the glass-metal seal. Usually the first step is to furnish the feedthrough pin with a glass bead produced by the superficial fusing of a glass ring. The procedure is known as glazing. The glass bead is subsequently joined to the discharge envelope by means of a pinch or melting procedure. The glass ring for glazing and the discharge envelope are usually made from glass with the same composition or with similar physical properties. The composition of the glass in the glass-metal seal is usually therefore the same as that of the glass discharge envelope. The thermal expansion coefficients of the discharge envelope and the feedthrough pins must be similar in order that stresses in the glass-metal seal do not become too high and cause the glass to break. Fe—Ni—Co materials with a low coefficient of thermal expansion similar to that of the glass are used for the feedthroughs. This material group is known as Kovar. W—Ni pins are also used.

These have the advantage of a higher thermal conductivity combined with an excellent resistance to sputtering of $Hg^+$ ions. The latter property is necessary in the area where the feedthrough pin enters the discharge envelope. Erosion of the material can occur in this area due to glow discharge. The material which is removed in erosion is precipitated in neighboring regions and can trap Hg in the process, leading to a reduction in the Hg concentration and therefore to a decrease in the luminance of the lamp. If material is precipitated on the inner surface of the discharge envelope, the same can turn black, which in turn once more leads to a reduction in the luminance of the lamp.

Feedthrough pins made from molybdenum have been described in addition to those made of W—Ni. Molybdenum feedthrough pins are used extensively in the pinch seals of alumina silicate glass, for example, in H4, H7, H8, H9, or H11 halogen lamps. These glasses usually contain 12 to 18 wt % $Al_2O_3$. This high alumina content means that the glasses have a high softening temperature and therefore a high working temperature, which is too high for the economic production of cold cathode fluorescent lamps. If Mo feedthrough pins are melt or pinch sealed with the glasses designed to be used with W—Ni or Kovar pins then inadmissibly high stresses occur in the seal and the Mo pin does not adequately seal to the glass causing failure due to cracks in the glass or leaks. Cracks in the glass can occur immediately during manufacturing or may occur during use of the lamp as a backlight source.

Japanese patent application JP 11-015147 (published 2000215849 A) describes molybdenum current carrying pins for cold cathode fluorescent lamps, with the pin diameter defined in relation to the diameter of the discharge envelope. These are advantageously coated with Pt, Ni or Au to increase the mechanical strength of the discharge envelope, to reduce the formation of cracks, which occur during the sealing of the glass to the pins. The composition of the glass is not disclosed.

In addition to Kovar and tungsten, molybdenum feedthrough pins are suggested for fluorescent lamps with a double-shell discharge envelope in Japanese patent application JP 10-257457 (published 2000057999 A). The glass composition is not disclosed in the publication.

The miniaturization of LCD displays has lead to the miniaturization of the cold cathode fluorescence lamp. This has led to the introduction of hollow cathodes as described in Japanese patent application JP 01-151148. Nickel is usually used as the material for the cylindrical electrodes. The Ni hollow cathode is welded to a Kovar feedthrough pin. The sputter resistance of Ni is insufficient for further miniaturization. For this reason materials with a higher sputter resistance e.g. niobium, tantalum and molybdenum have been suggested for use in hollow cathodes. These are joined to feedthrough pins made from resistance-welded W and Ni pins. Due to the high melting point and intrinsic brittleness of tungsten, a tungsten pin and a cylindrical electrode can only be welded together with effort, e.g. by using laser welding techniques. For this reason, filler materials are used during welding that form lower melting point compounds that react with the tungsten and/or the hollow cathode material. These filler materials contain nickel, iron or cobalt. Using these filler materials however leads to a reduction in the thermal conductivity and to increased sputtering.

SUMMARY OF THE INVENTION

It is accordingly an object of the invention to provide a cold cathode fluorescent lamp which overcomes the above-mentioned disadvantages of the heretofore-known devices and methods of this general type and which provides for a cold cathode fluorescent lamp with hollow cathodes and highly sputter-resistant feedthrough pins where the joint between the hollow cathode and the feedthrough pin is achieved economically and reproducibly and the feedthrough pins are joined to the discharge envelope in a vacuum-tight seal without cracking the glass.

With the foregoing and other objects in view there is provided, in accordance with the invention, a cold cathode fluorescent lamp, essentially consisting of:

a discharge envelope of hard glass, said discharge envelope having a phosphor coating on an inner surface thereof and containing a filling gas component capable of emitting UV light;

a plurality of hollow cathodes inside said discharge envelope;

a plurality of feedthrough pins connected to said hollow cathodes; and a plurality of glass-metal seals joining said feedthrough pins to the said discharge envelope in a vacuum-tight seal;

wherein:

said feedthrough pins are made from molybdenum or a molybdenum alloy at least along a length of said glass-metal seal;

said hollow cathode is made at least in part from a material selected from the group consisting of molybdenum, molybdenum alloy, niobium, and niobium alloy;

said hard glass, in a region of said glass-metal seals, having a coefficient of thermal expansion of $4.0\text{-}5.3\times10^{-6}$ $K^{-1}$ and the following composition:

| | |
|---|---|
| $SiO_2$ | 55-75 wt. %, |
| $B_2O_3$ | 13-25 wt. %, |
| $Al_2O_3$ | 0-10 wt. %, |
| alkali oxides | 5-12 wt. %, |
| alkali earth oxides | 0-3 wt. %, |
| $ZrO_2$ | 0-5 wt. %, |
| $TiO_2$ | 0-10 wt. %, |
| a remaining oxide content of | 0-5 wt. %. |

In other words, according to one aspect of the invention there is provided a feedthrough pin made from molybdenum or a molybdenum alloy at least for the length of the glass-metal seal. According to another aspect of the invention there is provided a hollow cathode made at least in part from materials belonging to the group of molybdenum, molybdenum alloy, niobium and niobium alloy. According to another aspect of the invention there is provided the glass in the glass-metal seal with a coefficient of thermal expansion of $4.2\text{-}5.2\times10^{-6}$ $K^{-1}$ (20° C. to 300° C.) and the following composition: 55-75 wt. % $SiO_2$, 13-25 wt. % $B_2O_3$, 0-10 wt. % $Al_2O_3$, 5-12 wt. % alkali oxides, 0-3 wt. % alkaline earth oxides, 0-5 wt. % $ZrO_2$, 0-10 wt. % $TiO_2$ und 0-5 wt. % remaining oxides.

Feedthrough pins made from molybdenum and molybdenum alloys are easily welded with hollow cathodes made from molybdenum, tantalum and niobium. This enables the amount of filler material used to be significantly reduced. When a sufficiently high process reproducibility is ensured then a reliable weld can be achieved without the use of filler materials. In this way the sputter resistance and the thermal conductivity can be significantly improved in the critical transition area between hollow cathode and feedthrough pin. This is particularly advantageous at decreased ambient temperatures and the resulting higher currents caused thereby. Using a glass with a thermal expansion coefficient and the above-outlined composition, at least in the glass-metal seal, and when the glass-metal contact is sufficient, it is possible to keep the stresses in the glass-metal composite so low that cracks in the glass and other defects which lead to leakage do not occur during manufacture nor during use. Existing manufacturing methods can be used in manufacturing the glass-metal seals. Glazing of the feedthrough pin can be achieved in a separate step using a glass tube and melting of the same. Subsequent connection with the discharge envelope takes place at sufficiently low temperature.

Depending on the lamp type, molybdenum feedthrough pins with a diameter between 0.4 and 1.2 mm are used. To reduce the costs of the feedthrough, it is advantageous to join a molybdenum pin to a nickel, iron or cobalt pin or a pin from an alloy of these metals using resistance welding. Feedthrough pins, which are made of a pair of materials, are usually called combi-pins. The Mo—Ni (Fe, Co) combi-pin is welded to the hollow cathode at the Mo end using resistance welding or another suitable joining technique. Glazing is applied only or mostly in the molybdenum region. The filling gas therefore does not come into contact with the Ni (Fe, Co) region of the pin during use. It is particularly advantageous when the combi-pin is made from Mo and NI.

For reasons of standardization in the glass manufacture it is preferable that the glass tube used for the glazing and the discharge envelope are made of glasses with identical composition. If this is not necessary or if the production process is such that a low working temperature is necessary for the production of the glass-metal seal, then it can be advantageous to use different glass types in the glass-metal seal and the discharge envelope. Components of the glass such as $TiO_2$ used to increase the stability of the discharge envelope to UV light are not a mandatory component of the glass in the glass-metal seal. A difference in expansion coefficient between the glazing in the glass-metal seal and the discharge envelope can be overcome by using transition glasses which are applied in one or more layers between glazing and discharge envelope. In a particularly advantageous embodiment of the invention the thermal expansion coefficient of the glass of the discharge envelope $\alpha_1$ and the thermal expansion coefficient of the glass in the glass-metal seal $\alpha_2$ fulfill the following relationship: $0 \leq (\alpha_1 - \alpha_2) \leq 5 \times 10^{-6}$ $K^{-1}$. Further, the rejection rate due to leaky lamps can be reduced to a rate in low ppm if the thermal expansion coefficient of the glass in the glass-metal seal $\alpha_2$ and the thermal expansion coefficient of the feedthrough pin $\alpha_3$ satisfy the following relationship: $1 \times 10^{-7} K^{-1} \leq (\alpha_3 - \alpha_2) \leq 1.3 \times 10^{-6} K^{-1}$.

Other features which are considered as characteristic for the invention are set forth in the appended claims.

Although the invention is illustrated and described herein as embodied in a cold cathode fluorescent lamp with a molybdenum electrode, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiment and example when read in connection with the accompanying drawing.

BRIEF DESCRIPTION OF THE DRAWING

The FIGURE shows a schematic diagram of a cross-section through a cold cathode fluorescent lamp.

DESCRIPTION OF THE PREFERRED EMBODIMENT AND EXAMPLE

Referring now to the sole FIGURE of the drawing in detail, which diagrammatically illustrates an exemplary cold cathode fluorescent lamp feedthrough combi-pins 5 were made by joining the abutting face of Mo-0.3 wt. % $La_2O_3$ pins 7 and nickel pins 8 each with a diameter of 0.8 mm using AC resistance welding. After a pre-oxidizing treatment, glass tubes with an outer diameter of 1.9 mm and an inner diameter of 0.85 mm were pushed over the combi-pins 5, positioned over the molybdenum region and melted on using a gas burner. Glass tubes of different compositions were used as described in the following table. The glazed combi-pins at their molybdenum end were welded to a molybdenum cylindrical electrode 4 with an outside diameter of 1.7 mm, a height of 4 mm and a wall thickness of 0.1 mm. This was also done using AC resistance welding.

Subsequently the components so manufactured were pinch-connected at the glazing 6 to the discharge envelope 3. The envelope 3 is coated on its inner surface with phosphor 2 using typical production parameters and gas filling techniques. The glass of the discharge envelope 3 had the same composition as the glazing. Feedthrough pins 5 glazed using variant 1 were also pinch connected to discharge envelopes 3 made from glass with a composition according to variants 2 to 4. All of the cold cathode fluorescent lamps 1 so manufactured had a vacuum-tight, crack-free glass-metal seal.

TABLE

Composition of the glass used for tubes for glazing and discharge envelopes.

|  | Variant 1 | Variant 2 | Variant 3 | Variant 4 |
|---|---|---|---|---|
| $SiO_2$ | 68.55 | 64.2 | 68.5 | 69.3 |
| $B_2O_3$ | 19 | 19 | 17.5 | 16.4 |
| $Al_2O_3$ | 2.7 | 2.7 | 3.8 | 3.6 |
| $Na_2O$ | 0.75 | 0.7 | 0.85 | 0.95 |
| $K_2O$ | 7.65 | 7.5 | 7.6 | 7.85 |
| $Li_2O$ | 0.65 | 0.7 | 0.85 | 0.85 |
| ZnO | 0.6 | 0.6 |  |  |
| $ZrO_2$ |  |  | 0.3 | 0.35 |
| $As_2O_3$ | 0.1 | 0.1 |  |  |
| $TiO_2$ |  | 4.5 | 0.6 | 0.7 |

This application claims the priority, under 35 U.S.C. § 119, of Austrian utility patent application No. AT GM 370/2003, filed May 27, 2003; the entire disclosure of the prior application is herewith incorporated by reference.

We claim:

1. A cold cathode fluorescent lamp, comprising:
   a discharge envelope of hard glass, said discharge envelope having a phosphor coating on an inner surface thereof and containing a filling gas component capable of emitting UV light;
   a plurality of hollow cathodes inside said discharge envelope;
   a plurality of feedthrough pins connected to said hollow cathodes; and
   a plurality of glass-metal seals joining said feedthrough pins to the said discharge envelope in a vacuum-tight seal;
   wherein:
   said feedthrough pins have a diameter of 0.4-1.2 mm and are made of $Mo-La_2O_3$ at least along a length of said glass-metal seal;
   said hollow cathode is made at least in part from a material selected from the group consisting of molybdenum and molybdenum alloy;
   said hard glass, in a region of said glass-metal seals, having a coefficient of thermal expansion of $4.2-5.2 \times 10^{-6} K^{-1}$ and the following composition:

| $SiO_2$ | 55-75 wt. %, |
| $B_2O_3$ | 13-25 wt. %, |
| $Al_2O_3$ | 0-10 wt. %, |
| alkali oxides | 5-12 wt. %, |
| alkali earth oxides | 0-3 wt. %, |
| $ZrO_2$ | 0-5 wt. %, |
| $TiO_2$ | 0-10 wt. %, |
| a remaining oxide content of | 0-5 wt. %. |

2. The cold cathode fluorescent lamp according to claim 1, essentially consisting of said discharge envelope with said phosphor coating and said filling gas component; said plurality of hollow cathodes; said plurality of feedthrough pins; and said plurality of glass-metal seals.

3. The cold cathode fluorescent lamp according to claim 1, wherein said feedthrough pins comprise a first region made from said $Mo-La_2O_3$ and a second region containing at least 50 wt.% Ni, Fe or Co, and wherein a weld connection joins said first region and said second region.

4. The cold cathode fluorescent lamp according to claim 3, wherein said first region and said second region are joined by resistance welding or by laser welding.

5. The cold cathode fluorescent lamp according to claim 1, wherein said feedthrough pins and said hollow cathode are joined by welding substantially without use of filler material.

6. The cold cathode fluorescent lamp according to claim 1, wherein said hard glass at said glass-metal seal has the following composition:

| $SiO_2$ | 60-72 wt. %, |
| $B_2O_3$ | 15-20 wt. %, |
| $Al_2O_3$ | 1-5 wt. %, |
| alkali oxides | 6-10 wt. %, |
| $ZrO_2$ | 0.05-5 wt. %, |
| $TiO_2$ | 0.5-10 wt. %, |
| and a remaining oxide content of | 0-1 wt. %. |

7. The cold cathode fluorescent lamp according to claim 1, wherein the composition of said glass in the region of said glass-metal seal is equal to a composition of said glass of the discharge envelope.

8. The cold cathode fluorescent lamp according to claim 1, wherein the coefficient of thermal expansion $\alpha_1$ of said glass of said discharge envelope and the coefficient of thermal expansion $\alpha_2$ of said glass in region of said glass-metal seal satisfy the following requirement: $0 \leq (\alpha_1 - \alpha_2) \leq 5 \times 10^{-6} K^{-1}$.

9. The cold cathode fluorescent lamp according to claim 1, wherein the coefficient of thermal expansion $\alpha_2$ of said glass in the glass-metal seal and a coefficient of thermal expansion $\alpha_3$ of said feedthrough pins satisfy the following requirement: $1 \times 10^{-7} K^{-1} \leq (\alpha_3 - \alpha_2) \leq 1.3 \times 10^{-6} K^{-1}$.

10. The cold cathode fluorescent lamp according to claim 1, wherein said feedthrough pins are partially or completely coated with one or more oxides of the following metals Li, Mg, Ca, Sr, Ba, Sc, Y, lanthanides, Ti, Zr, Hf, Al, Ga, Si and Pb for at least a length of said glass-metal seal.

* * * * *